(12) United States Patent
Kim (10) Patent No.: US 6,349,123 B1
(45) Date of Patent: Feb. 19, 2002

(54) ASYMMETRIC DATA TRANSMISSION APPARATUS USING ASYMMETRIC DIGITAL SUBSCRIBER LINES, AND SUBSCRIBER LINE CONNECTION METHOD THEREFOR

(75) Inventor: Heung-Soo Kim, Ahnsan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/132,670

(22) Filed: Aug. 12, 1998

(30) Foreign Application Priority Data

Aug. 30, 1997 (KR) .......................................... 97-43776

(51) Int. Cl.[7] .................................................. H04J 1/00
(52) U.S. Cl. .................................... 375/480; 375/222
(58) Field of Search ............................... 370/357, 480, 370/485, 419; 375/222; 379/93.06, 93.07, 93.14, 93.18

(56) References Cited

U.S. PATENT DOCUMENTS

| | | | |
|---|---|---|---|
| 4,890,316 A | * 12/1989 | Walsh et al. | 379/93.33 |
| 5,577,105 A | * 11/1996 | Baum et al. | 379/93 |
| 5,598,456 A | * 1/1997 | Feinberg | 379/42 |
| 5,668,857 A | 9/1997 | McHale | 379/93.07 |
| 5,852,655 A | * 12/1998 | McHale et al. | 379/93.14 |
| 5,889,856 A | * 3/1999 | O'Toole et al. | 379/399 |
| 6,044,403 A | * 3/2000 | Gerszberg et al. | 709/225 |
| 6,148,006 A | * 11/2000 | Dyke et al. | 370/480 |
| 6,163,599 A | * 12/2000 | McHale | 379/93.28 |

* cited by examiner

Primary Examiner—David R. Vincent
(74) Attorney, Agent, or Firm—Sughrue Mion, PLLC (57) ABSTRACT

An asymmetric data transmission apparatus using asymmetric digital subscriber lines, which connects a high-speed data network to telephone subscriber lines in response to a demand of a subscriber, is provided. The apparatus contains subscriber line connectors which are connected to the telephone subscriber lines, which include activation sensors that receive activation signals from remote units via the subscriber lines, and which receive output signals from the remote units and output corresponding analog signals. Also, a particular subscriber line connector inputs a particular output signal from a particular remote unit via a particular telephone subscriber line and outputs a particular analog signal. The apparatus also contains subscriber modems which are connected to digital lines of the network, which modulate output digital signals transmitted from any the network via the digital lines into output analog signals, and which demodulate input analog signals into input digital signals and supply the input digital signals to the network. Also, a particular subscriber modem inputs a particular input analog signal and outputs a particular input digital signal. The apparatus also includes a connection circuit which selectively connects the particular subscriber modem to the particular subscriber line connector and which inputs the particular received analog signal and outputs the particular input analog signal.

12 Claims, 8 Drawing Sheets

ASYMMETRIC DATA TRANSMISSION APPARATUS USING ASYMMETRIC DIGITAL SUBSCRIBER LINES, AND SUBSCRIBER LINE CONNECTION METHOD THEREFOR

FIELD OF THE INVENTION

The present invention relates to a transmission apparatus for connecting a high-speed data network to a subscriber line in response to a demand from a subscriber. More particularly, the present invention relates to an asymmetric data transmission apparatus using asymmetric digital subscriber lines and relates to a subscriber line connection method employed by the apparatus.

BACKGROUND OF THE INVENTION

An asymmetric digital subscriber line ("ADSL") can achieve high-speed downstream transmission and low-speed upstream transmission by using a frequency band which is higher than the frequency band of a voice signal and by using an existing telephone subscriber line. The downstream transmission represents a transmission from a network to a subscriber, and the upstream transmission represents a transmission from the subscriber to the network.

An asymmetric data transmission apparatus using the ADSL connects a high-speed data network to a telephone subscriber line in response to a demand from a subscriber. Thus, communication services such as video on demand ("VOD") and other internet services can he provided via the subscriber line to the subscriber.

The asymmetric data transmission apparatus contains an asymmetric data transmission remote unit ("remote unit") connected to each of the subscriber lines and contains an asymmetric data transmission central unit ("central unit") connected between the high-speed data network and the subscriber lines. The central unit communicates with the remote units by using a higher frequency band than the frequency band of the voice signal and comprises subscriber modems. The subscriber modems modulate and demodulate signals transmitted between the high-speed data network and the remote units, and one subscriber modem is fixedly assigned to each subscriber line.

Also, each subscriber modem includes a voice signal splitter, and the voice signal splitter extracts a voice signal and an analog signal from its corresponding subscriber line. The voice signal is used during telephone calls, and the analog signal is a data signal which communicates with the high-speed data network. The voice signal splitter transmits the voice signal to a telephone exchange and prevents the analog signal from being transmitted to the telephone exchange.

The asymmetric data transmission apparatus described above has several disadvantages. For example, since one subscriber modem is fixedly assigned to each of the remote units, a large number of subscriber modems are required and must be in a standby state during the operation of the asymmetric data transmission apparatus. As a result, the resources of the signal lines are wasted, and the cost of the apparatus per signal line increases.

SUMMARY OF THE INVENTION

An object of the present invention is to provide an asymmetric data transmission apparatus and a subscriber line connection method employed by the apparatus which can reduce the waste of the line resources and raise the efficiency of the apparatus.

In order to overcome the above and other objects, an asymmetric data transmission apparatus using asymmetric digital subscriber lines, which connects a high-speed data network to telephone subscriber lines in response to a demand of a subscriber, is provided. The apparatus comprises: a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requests from said remote units to be respectively connected to said high-speed data network, and wherein a particular subscriber line connector inputs a particular output signal from a particular remote unit via a particular telephone subscriber line and outputs a particular received analog signal; a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and a connection circuit which selectively connects said particular subscriber modem to said particular subscriber line connector and which inputs said particular received analog signal and outputs said particular input analog signal.

In order to additionally overcome the above and other objects, a method employed by an asymmetric data transmission apparatus using asymmetric digital subscriber lines, which connects a high-speed data network to telephone subscriber lines in response to a demand from a subscriber, said method comprising the steps of: (a) sensing an activation signal via a particular telephone subscriber line from a particular remote unit requesting said particular remote unit to be connected to said high-speed data network, wherein said particular remote unit is one of a plurality of remote units and said particular telephone subscriber line is one of a plurality of telephone subscriber lines respectively connected to said remote units; (b) activating a particular subscriber modem connected to said high-speed data network in response to said activation signal being sensed, wherein said particular subscriber modem is one of a plurality of subscriber modems; and (c) selectively connecting said particular subscriber modem to said particular telephone subscriber line in response to said activation signal being sensed to start a communication.

BRIEF DESCRIPTION OF THE DRAWINGS

The above and other objects, features, and advantages of the present invention will become more apparent from a review of the following detailed description and the accompanying drawings in which.

DETAILED DESCRIPTION OF THE DETAILED EMBODIMENTS

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations and components of the present invention which would have been known to one skilled in the art are omitted for the sake of clarity and brevity. Also, in the figures, similar reference numerals designate similar elements.

Figure 1:
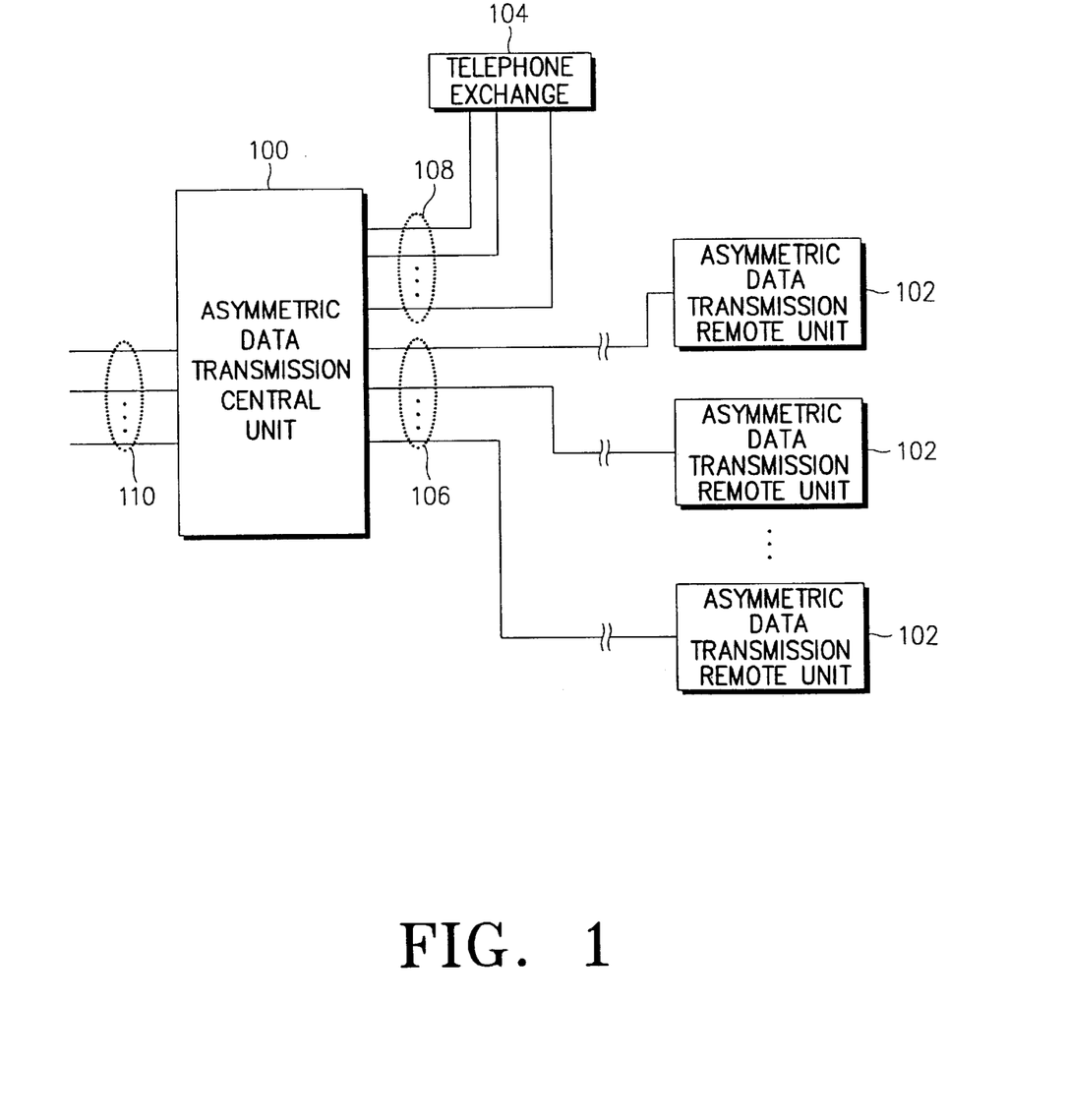
FIG. 1 is a block diagram of a typical asymmetric data transmission apparatus using an asymmetric digital subscriber line ("ADSL")

FIG. 1 shows a typical system configuration of an asymmetric data transmission apparatus using an asymmetric digital subscriber line ("ADSL"). As shown in the figure, the apparatus contains an asymmetric data transmission central unit 100, a plurality of asymmetric data transmission remote units 102, and a telephone exchange 104.

The central unit 100 is connected to a high-speed data network via digital lines 110, is connected to the remote units 102 via subscriber lines 106, and is connected to the telephone exchange 104 via subscriber lines 108. The subscriber lines 106 and 108 are telephone subscriber lines and are identical except for the fact that the lines 106 are connected to the remote units 102 and the lines 108 are connected to the telephone exchange 104. Voice signals and analog signals transmitted from the remote units 102 are separated from each other by voice signal splitters contained in the central unit 100. Then, the splitters output the voice signals to the telephone exchange 104 via the subscriber lines 108 and prevent the analog signals from being transmitted to exchange 104.

In the typical asymmetric data transmission apparatus shown in FIG. 1, subscriber modems are contained in the central unit 100 and one subscriber modem is fixedly assigned to each remote unit 102. Therefore, during the operation of the apparatus, a large number of the subscriber modems are held in a standby state.

However, in an embodiment of the present invention, the number of the subscriber modems is less than the number of the remote units 102. As a result, the subscriber modems are selectively connected to the remote units 102, and a large number of subscriber modems are not held in a standby state during the operation of the apparatus.

Figure 2:
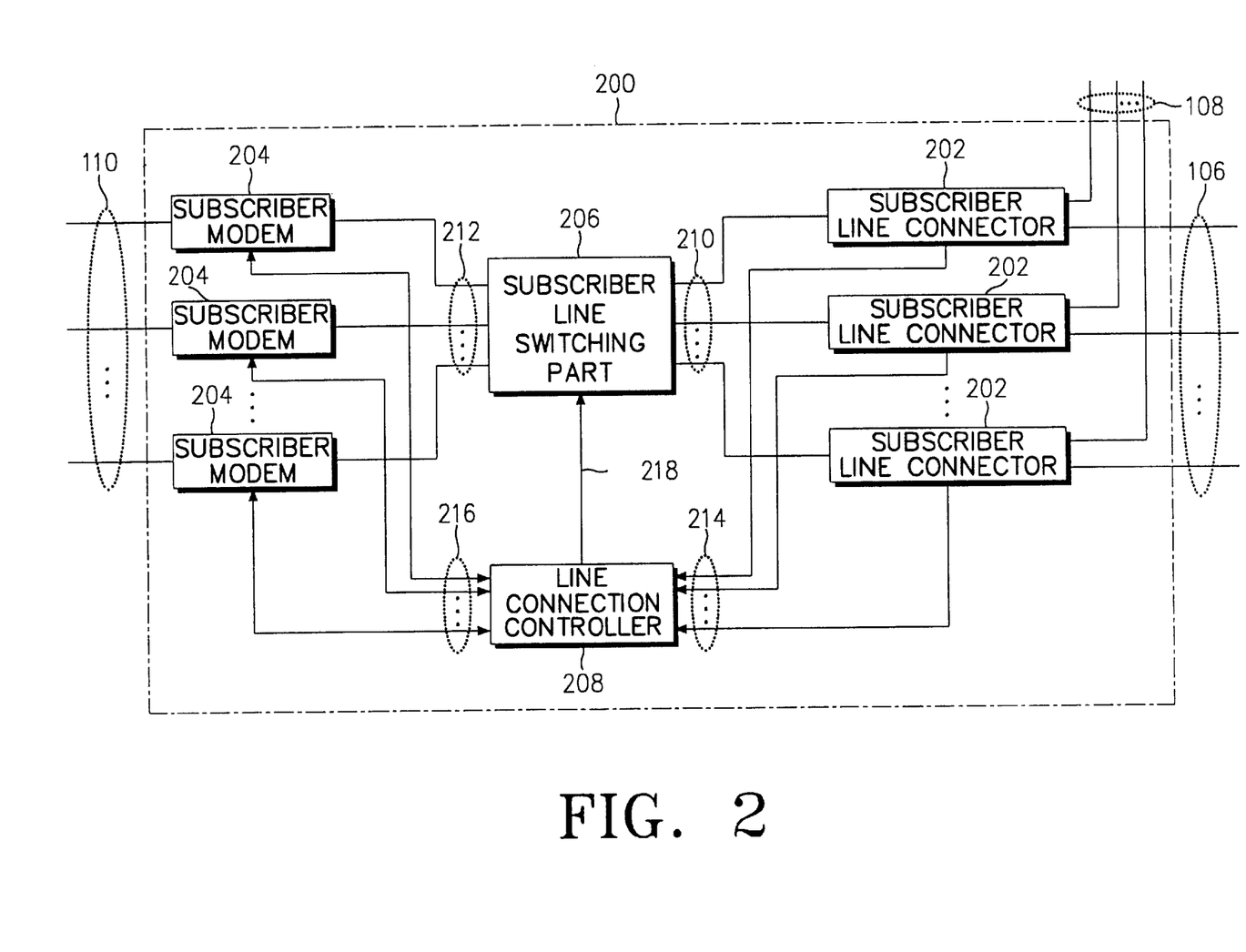
FIG. 2 is a block diagram of a central unit of an asymmetric data transmission apparatus in accordance with a preferred embodiment of the present invention.

FIG. 2 illustrates a central unit 200 in accordance with the present embodiment. As shown in the figure, the central unit 200 comprises a plurality of subscriber line connectors 202, a plurality of subscriber modems 204, a subscriber line switching part 206, and a line connection controller 208.

The subscriber line connectors 202 are connected to the subscriber line switching part 206 via lines 210, and each of the connectors 202 are connected to one of the subscriber lines 106. Each of the subscriber line connectors 202 inputs an analog signal and a voice signal from its corresponding subscriber line 106 and separates the analog signal from the voice signal. Then, the connector 202 outputs the voice signal to a telephone exchange 104 via a corresponding subscriber line 108 and outputs the analog signal via a corresponding line 210 to the subscriber line switching part 206. The analog signal represents a signal which is transmitted between the high-speed data network and remote units 102. Each of the subscriber line connectors 202 also senses an activation signal from its corresponding remote unit 102 when the unit 102 requests to be connected to the high-speed data network.

The subscriber modems 204 are respectively connected to digital lines 110 of the high-speed data network, and each modem is selectively connected to one of the subscriber line connectors 202 (and its corresponding remote unit 102) via the subscriber line switching part 206. When a particular subscriber modem 204 is connected to a particular remote unit 102 via a particular subscriber line connector 202, the subscriber modem 204 modulates a digital signal transmitted from the high-speed data network into an analog signal, and such analog signal is transmitted to the remote unit 102 via the switching part 206, the subscriber line connector 202, and the subscriber line 106. Also, the subscriber modem 204 demodulates an analog signal transmitted from the remote unit 102 into a digital signal and supplies the digital signal to the high-speed data network via its corresponding digital line 110.

The subscriber line switching part 206 is connected to the subscriber line connectors 202 via lines 210 and is connected to the subscriber modems 204 via lines 212. Also, the switching part 206 selectively connects the connectors 202 to the modems 204 under the control of the line connection controller 208.

Specifically, the line connection controller 208 is connected to the subscriber line connectors 202 via lines 214 and is connected to the subscriber modems 204 via the lines 216. When one of the remote units 102 outputs an activation signal to a corresponding line connector 202, the line connector 202 senses the activation signal and outputs a corresponding activation sensing signal to the line connection controller 208 via the line 214. In response to the activation sensing signal, the line connection controller 208 outputs a subscriber modem connection control signal to a particular subscriber modem 204 in a standby state to activate the particular subscriber modem 204. Also, the controller 208 outputs a switching control signal to the subscriber line switching part 206 via a line 218 to instruct the switching part 206 to selectively connect the particular modem 204 to the subscriber line connector 202 which has output the activation signal. As a result, the particular subscriber modem 204 is operatively connected to one of the remote units 102. As mentioned above, the number of the subscriber modems 204 is less than the number of the remote units 202.

Figure 3:
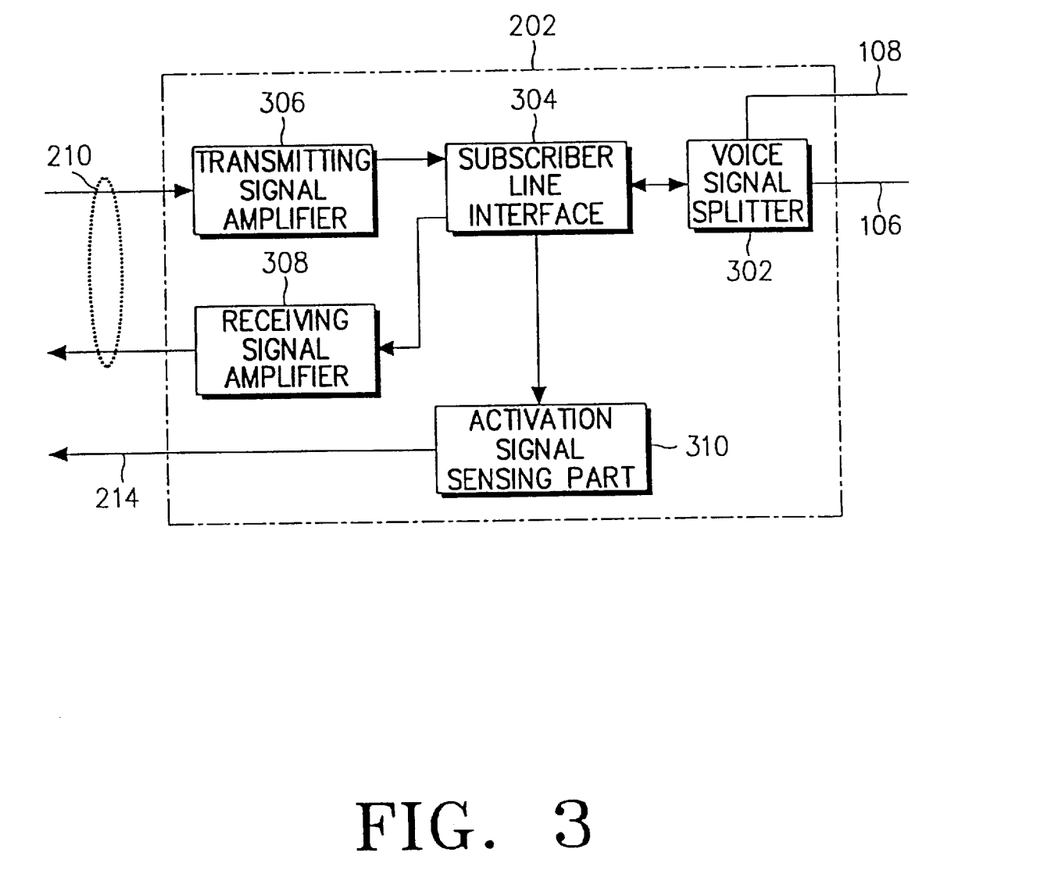
FIG. 3 is a block diagram of a subscriber line connector of an asymmetric data transmission apparatus in accordance with a preferred embodiment of the present invention.

FIG. 3 illustrates one of the subscriber line connectors 202 shown in FIG. 2. The subscriber line connector 202 comprises a voice signal splitter 302, a subscriber line interface 304, a transmitting signal amplifier 306, a receiving signal amplifier 308, and an activation signal sensing part 310.

The voice signal splitter 302 is connected to one of the subscriber lines 106 and one of the subscriber lines 108 shown in FIG. 2. The voice signal splitter 302 inputs a voice signal and analog signal from the subscriber line 106 and separates the voice signal from the analog signal. Then, the splitter 302 outputs the voice signal to the telephone exchange 104 via the subscriber line 108 and prevents the analog signal from being transmitted to the telephone exchange 104.

The subscriber line interface 304 is connected between the voice signal splitter 302 and the transmitting and receiving signal amplifiers 306 and 308. The interface 304 is used to match an impedance between the line 210 and the subscriber line 106 and may comprise a general transformer for impedance matching. Thus, for example, when one subscriber line connector 202 is connected with a particular one of the subscriber modems 204 via the subscriber line switching part 206, the connector 202 can transmit and receive an analog signal via the particular subscriber modem 204 and the remote unit 102. In other words, the interface 304 matches the analog signal transmitted between the particular modem 204 and the subscriber line 106 via the voice signal splitter 302.

Also, the interface 304 is connected to the activation signal sensing part 310. For example, the sensing part 310 may be connected to the line by which an activation signal is input from the voice signal splitter 302 to the subscriber line interface 304. In such case, the activation signal sensing part 310 can sense the activation signal sent from the remote unit 102 by inputting it via the subscriber line interface 304. In other words, when the activation signal is input from a remote unit 102 via the subscriber line 106, the subscriber line interface 304 also supplies the activation signal to the activation signal sensing part 310.

The transmitting signal amplifier 306 is connected to the subscriber line switching part 206 via one of the lines 210 shown in FIG. 2. When the amplifier 306 inputs an analog signal from the subscriber line switching part 206, it amplifies such signal and supplies it to the remote unit 102 via the interface 304.

The receiving signal amplifier 308 is connected to the subscriber line switching part 206 via one of the lines 210 shown in FIG. 2. When the amplifier 308 receives an analog signal from the remote unit 102 via the subscriber line interface 304, it amplifies such signal and supplies it to the switching part 206.

The activation signal sensing part 310 senses the activation signal received from the remote unit 102 via the subscriber line interface 304 and generates a corresponding activation sensing signal. Then, the activation sensing signal is supplied to the line connection controller 208 via one of the lines 214 shown in FIG. 2.

Figure 4:
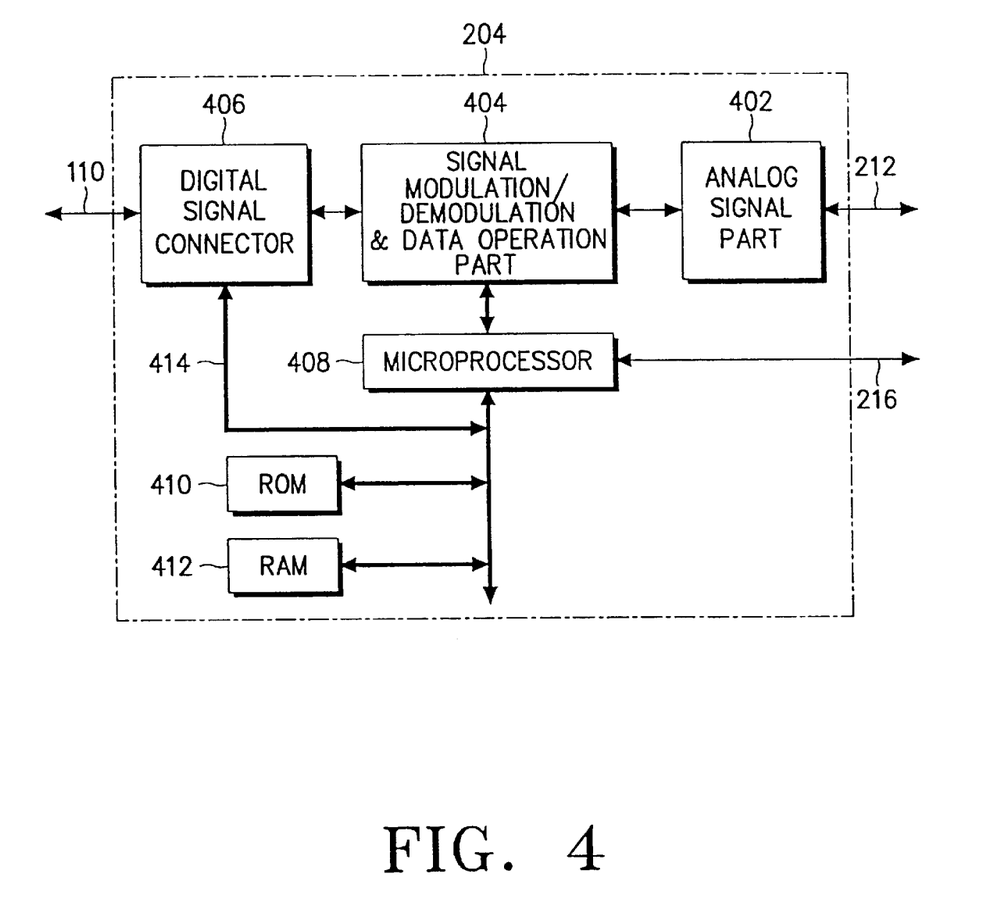
FIG. 4 is a block diagram of a subscriber modem of an ADSL in accordance with a preferred embodiment of the present invention.

FIG. 4 illustrates one of the subscriber modems 204 shown in FIG. 2. The subscriber modem 204 comprises an analog signal part 402, a signal modulation/demodulation and data operation ("SMDDO") part 404, a digital signal connector 406, a microprocessor 408, a read only memory ("ROM") 410, and a random access memory ("RAM") 412.

The analog signal part 402 is connected to the SMDDO part 404 and is connected to the subscriber line switching part 206 via one of the lines 212. When the subscriber modem 204 is selectively connected to a particular subscriber line connector 202 via the subscriber line switching part 206, the analog signal part 402 receives an analog signal from the particular subscriber line connector 202 via the switching part 206 and the line 212. Then, the analog signal part 402 controls and filters the level of the analog signal and outputs it to the SMDDO part 404. Also, the analog signal part inputs an analog signal from the SMDDO part 404, controls and filters the level of such signal, and outputs the signal to the particular subscriber line connector 202 via the line 212 and the switching part 206.

The digital signal connector 406 is connected to the SMDDO part 404 and is connected to the high-speed data network via one of the digital lines 110. The connector 406 inputs a digital signal output from the SMDDO part 404 and supplies it to the high-speed data network via the line 110 and inputs a digital signal from the high-speed data network and outputs it to the SMDDO part 404.

The SMDDO part 404 inputs the analog signal from the analog signal part 402, demodulates such signal into a digital signal, and outputs the demodulated digital signal to the digital signal connector 406. Also, the SMDDO part 404 inputs a digital signal from the digital signal connector 406, modulates such signal into an analog signal, and transmits the modulated analog signal to the analog signal part 402.

The microprocessor 408 is connected to SMDDO part 404 and the digital signal connector 406. Also, the microprocessor 408 is connected to the line connection controller 208 via one of the lines 216 shown in FIG. 2. When the microprocessor 408 receives a subscriber modem connection control signal from the controller 208 via the line 216, it initializes a particular remote unit 102 by controlling the digital signal connector 406 and the SMDDO part 404. The initialization accomplished between the subscriber modem 204 and the remote unit 102 may be equal to the initialization between the subscriber modem equipped in the central unit of the ADSL system and the modem equipped in the remote unit. Generally, initialization is executed on the basis of the state of the subscriber line though which the modem of the central unit is interlocked by the modem of the remote unit. As an example of such an initializing method, a transmission speed is optimally set according to the signal-to-noise ratio of each subscriber loop, and a bit is optimally assigned according to a frequency band currently used.

The microprocessor 408 also provides and controls the communication between the high-speed data network and the remote unit 102. In addition, after the communication between the network and the remote unit 102 ends, the microprocessor 408 enters a standby state and transmits a connection release request signal to the line connection controller 208 via the line 216. Also, the programs executed by the microprocessor 408 and the data generated by and processed by the microprocessor 408 are stored in the ROM 410 and the RAM 412.

As illustrated in the figure, the digital signal connector 406, microprocessor 408, ROM 410, and RAM 412 are interconnected via a bus 414. Also, the subscriber modem 204 is different from a general subscriber modem in that a voice signal splitter and an activation signal sensing part are not contained in the modem 204 and are contained in the subscriber line connectors 202. However, the fundamental operations for enabling communications between the high-speed data network and the remote units 102 are similar to the operations performed by a general subscriber modem.

Figure 5:
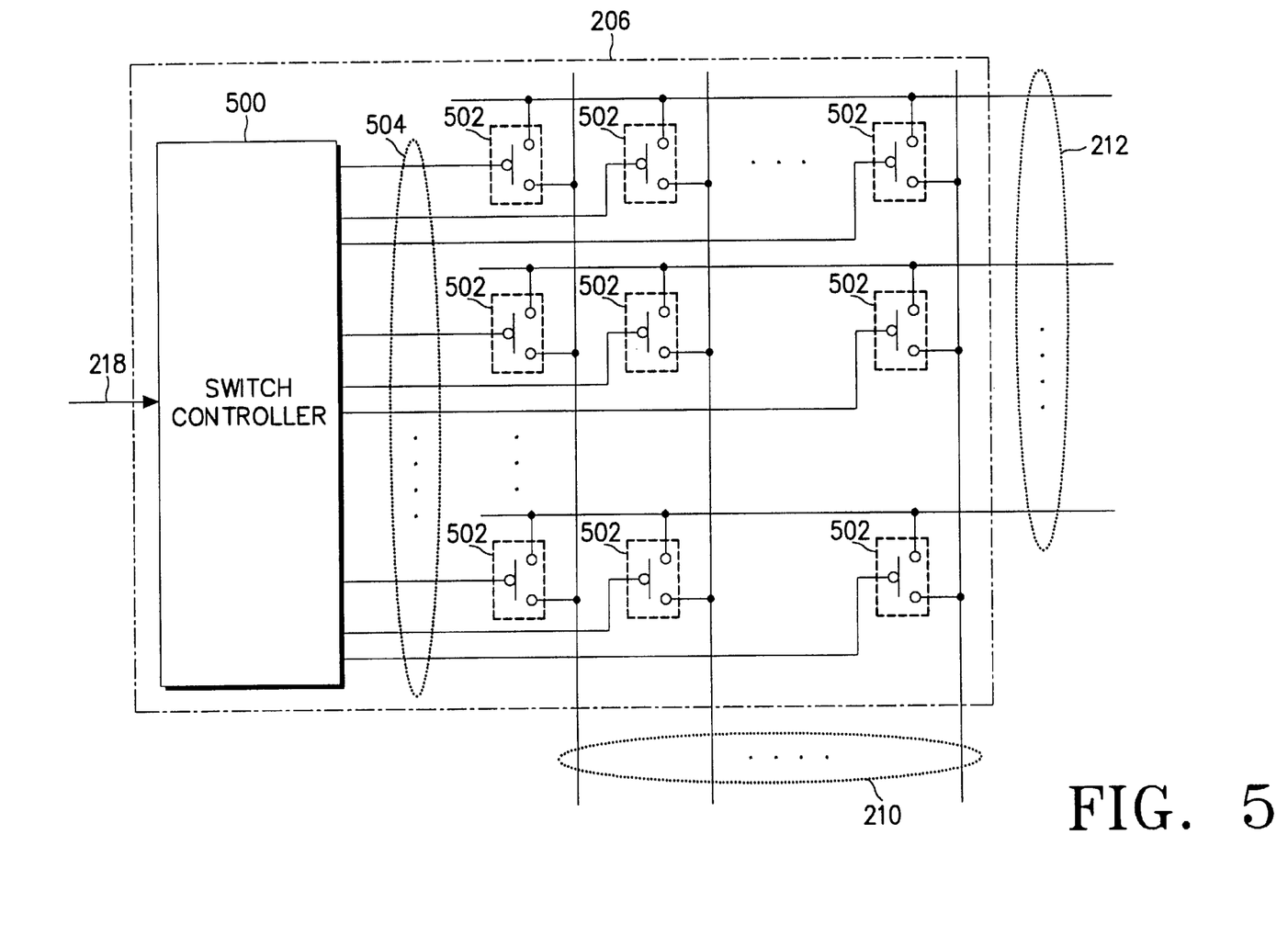
FIG. 5 is a block diagram of a subscriber line switching part of an asymmetric data transmission apparatus in accordance with a preferred embodiment of the present invention.

FIG. 5 illustrates an example of the detailed configuration of the subscriber line switching part 206 shown in FIG. 2. As shown in the figure, the switching part 206 comprises a switch controller 500 and a plurality of switches 502. The switches 502 are arranged as a matrix and selectively connect the lines 210 attached to the subscriber line connectors 202 with the lines 212 attached to the subscriber modems 204 based on control signals output from the switch controller 500 via lines 504. The switch controller 500 inputs the switching control signal from the line connection controller 208 via the line 218 and selectively switches the switches 502 based on the switching control signal.

Figure 6:
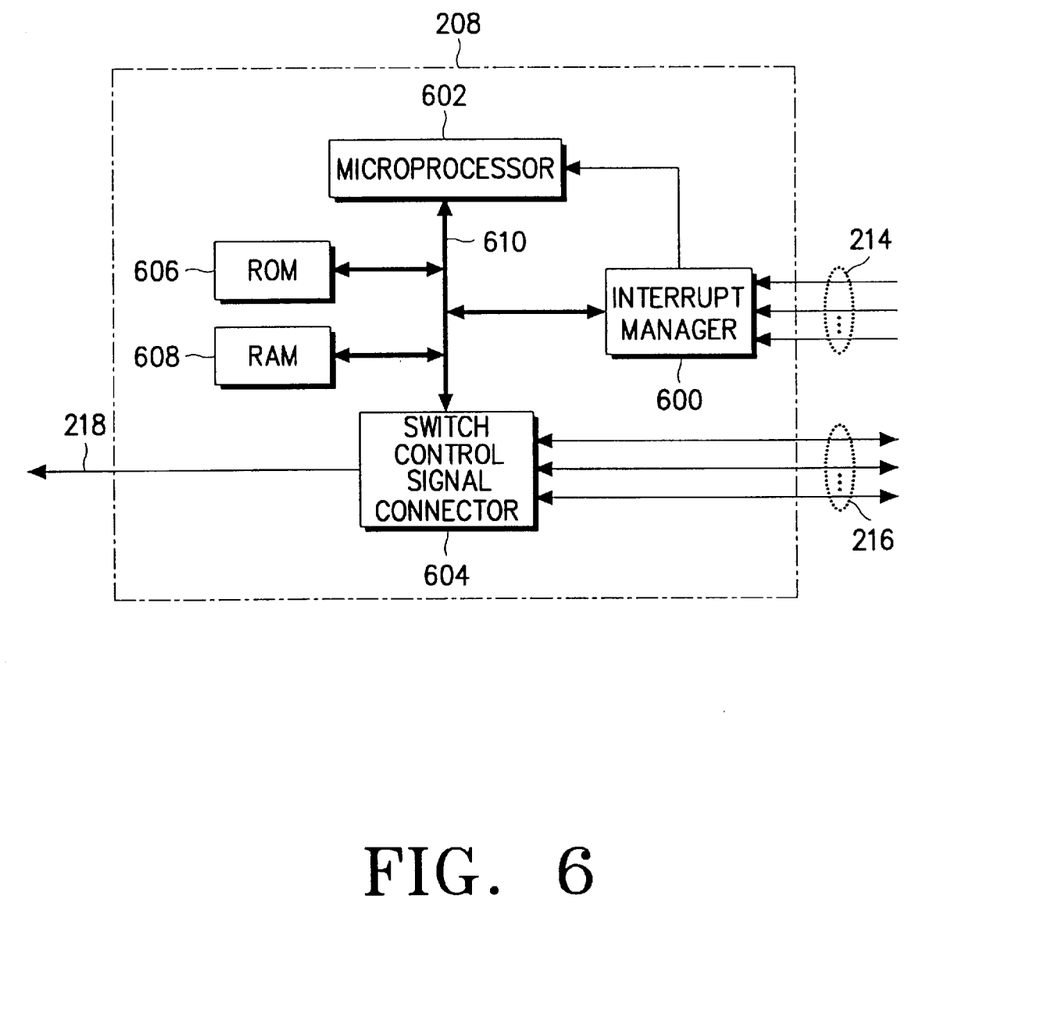
FIG. 6 is a block diagram of a line connection controller of an asymmetric data transmission apparatus in accordance with a preferred embodiment of the present invention.

FIG. 6 illustrates an example of the line connection controller 208 shown in FIG. 2. As shown in the figure, the controller 208 comprises an interrupt manager 600, a microprocessor 602, a switch control signal connector 604, a ROM 606, and a RAM 608.

The interrupt manager 600 is connected to the lines 214 of the subscriber line connectors 202 and is connected to the microprocessor 602. When the activation sensing signal is received from the activation signal sensing part 310 of a particular subscriber line connector 202, the interrupt manager 600 transmits an interrupt signal to the microprocessor 602 via an interrupt line and transmits data via a bus 610 to inform the microprocessor 602 that the particular subscriber line connector 202 has sensed an activation signal from its corresponding remote unit 102.

The switch control signal connector 604 is connected to the switch controller 500 of the subscriber line switching part 206 via the line 218 and is connected to the subscriber modems 204 via the lines 216. In response to the interrupt signal, the microprocessor 602 instructs the switch control signal connector 604 to generate the switching control signal supplied to the switch controller 500 and to generate the subscriber modem connection control signal for activating a particular subscriber modem 204. The switch control signal connector 604 also supplies the connection release request signal generated by the subscriber modems 204 via the lines 216 to the microprocessor 602. In response to such signal, the microprocessor 602 severs the connection between a particular subscriber modem 204 and a particular subscriber line connector 202 by instructing the switch control signal connector 604 to output an appropriate switching control signal to the switching part 206.

The ROM 606 and the RAM 608 store programs executed by the microprocessor 602 and store data processed by and generated by the microprocessor 602. Also, as shown in the figure, the interrupt manager 600, microprocessor 602, switch control signal connector 604, ROM 606, and RAM 608 are interconnected via the bus 610.

Generally, during the operation of the asymmetric data transmission apparatus, a particular remote unit 102 outputs an activation signal to the central unit 200 via a corresponding subscriber line 106 to request to be connected to the high-speed data network. In the central unit 200, the activation signal is sensed by the activation signal sensing part 310 of the subscriber line connector 202 connected to the particular remote unit 102. As a result, the activation signal sensing part 310 generates an activation sensing signal and transmits such signal to the interrupt manager 600 of the line connection controller 208. Then, the interrupt manager 600 supplies an interrupt signal and related data to the microprocessor 602 within the controller 208.

Figure 7:
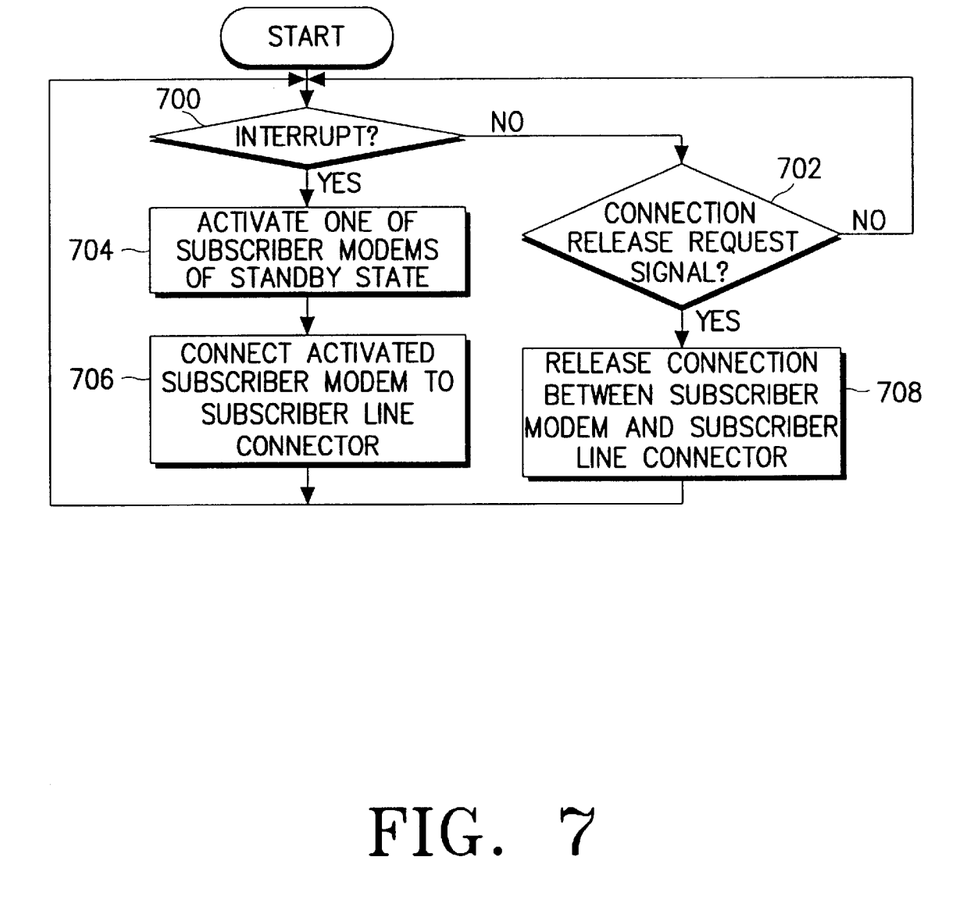
FIG. 7 is a flow chart showing a processing procedure of the line connection controller in accordance with a preferred embodiment of the present invention.

FIG. 7 illustrates an example of a procedure which is executed by the microprocessor 602. As shown in the figure, the microprocessor 602 determines if an interrupt signal is output from the interrupt manager 600 (step 700). If an interrupt signal is detected, the microprocessor 602 activates a particular subscriber modem 204 which is in a standby state (step 704). Specifically, the microprocessor 602 instructs the switch control signal connector 604 to output an appropriate subscriber modem connection control signal to the particular subscriber modem 204. Then, the microprocessor 602 connects the particular subscriber modem 204 to the subscriber line connector 202 which has sensed the activation signal from the particular remote unit 102 (step 706). In particular, the microprocessor 602 instructs the switch control signal connector 604 to output an appropriate switching control signal to the subscriber line switching part 206 via the line 218.

On the other hand, if an interrupt signal is not detected in step 700, the microprocessor 602 determines if a connection release request signal is received from a particular subscriber modem 204 via the switch control signal connector 604 (step 702). If the connection release request signal is received, the microprocessor 602 severs the connection between the particular subscriber modem 204 and the subscriber line connector 202 connected to the modem 204 (step 708). Specifically, the microprocessor 602 instructs the switch control signal connector 604 to output an appropriate switch control signal to the subscriber line switching part 206 via the line 218. If a connection release request signal is not detected in step 702, the procedure returns to step 700.

Figure 8:
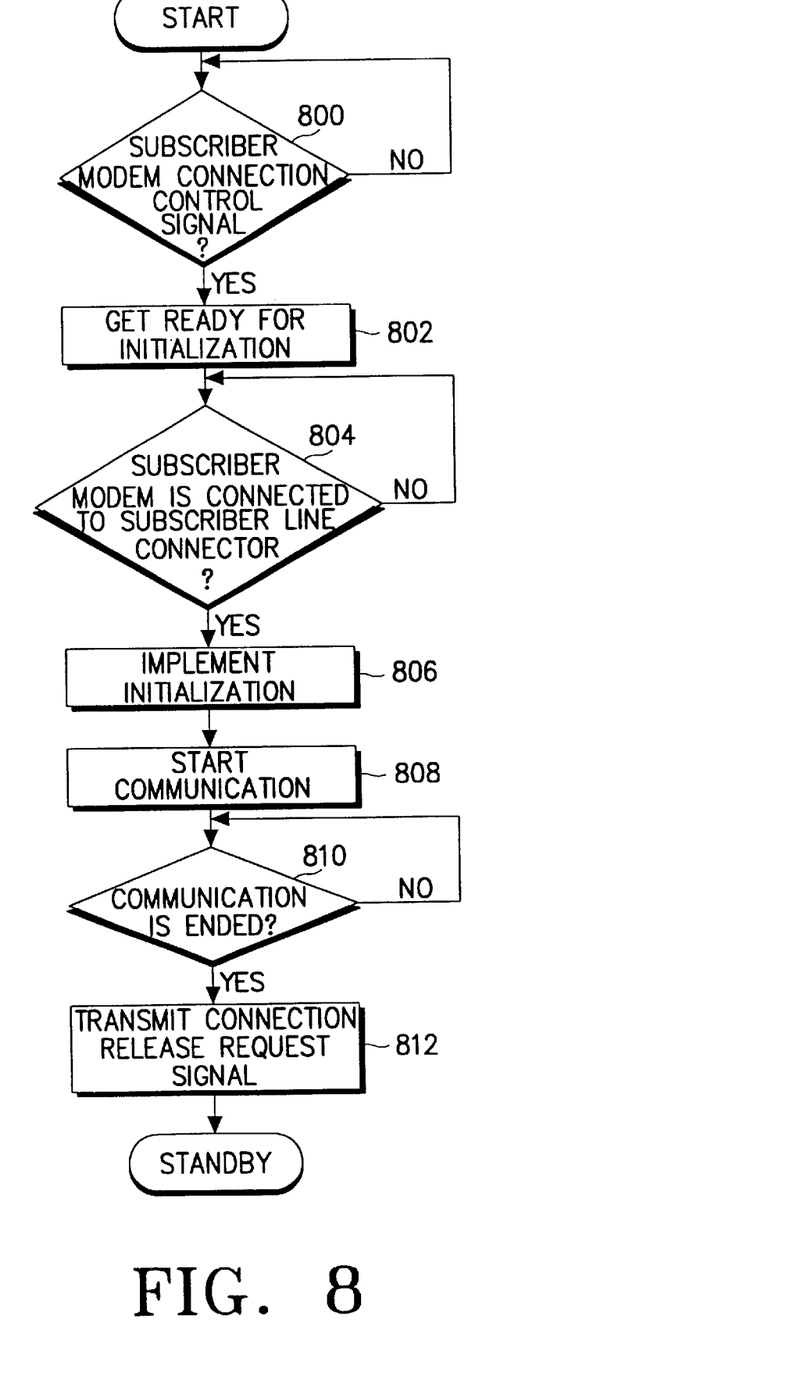
FIG. 8 is a flow chart showing a processing procedure of the subscriber modem in accordance with a preferred embodiment of the present invention.

FIG. 8 illustrates an example of a procedure which is executed by the microprocessor 408 contained in each of the subscriber modems 204. As shown in the figure, the microprocessor 408 determines if a subscriber modem connection control signal has been received from the line connection controller 208 (step 800). If such a signal has not been detected, the procedure returns to step 800.

On the other hand, if a subscriber modem connection control signal has been detected, the microprocessor 408 prepares to initialize communication with the particular remote unit 102 that has requested a connection and has caused the line connection controller 208 to output the subscriber modem connection control signal (step 802). Then, the microprocessor 408 determines if the subscriber modem 204 is connected via the subscriber line switching part 206 to the particular subscriber line connector 202 coupled to the particular remote unit 102.

If the subscriber modem 204 is not connected to the particular subscriber line connector 202, the procedure returns to step 804. However, if the subscriber modem 204 is connected to the connector 202, the microprocessor initializes the particular remote unit 102 (step 806) and begins communications between the high-speed data network and the particular remote unit 102 (step 808).

Once the communication has started, the microprocessor 408 determines if the communication has ended (step 810). If the communication has not ended, the procedure returns to step 810. On the other hand, if the communication has ended, the microprocessor 408 transmits the connection release request signal to the line connection controller 208 via the line 216 (step 812) and returns to the standby state.

As described above in conjunction with FIG. 7, the microprocessor 602 contained in the line connection controller 208 detects the connection release request signal output from the microprocessor 408 (step 702). Then, the microprocessor 602 causes the switching control signal connector 604 to output an appropriate switching control signal to the subscriber line switching part 206 to sever the connection between the particular subscriber modem 204 and the particular subscriber line connector 202 (step 708).

As shown above, a particular subscriber modem 204 is selectively connected to a particular remote unit 102 when the particular remote unit 102 requests such connection. As a result, a subscriber modem 204 does not have to be provided for each remote unit 102 and dedicated solely to such unit 102. Thus, the number of the subscriber modems 204 in the apparatus can be less than the number of the remote units 102. Since a small number of the subscriber modems 204 can accommodate a large number of the remote units 102, the efficiency of the central unit 200 is dramatically increased, and the number of subscriber modems 204 which must remain idle in a standby state is substantially reduced. Also, the number of lines wasted in the apparatus is reduced. As a result, the cost per line is reduced, and a low service charge can be achieved.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. For example, the transmitting and receiving signal amplifiers. 306 and 308 contained in the subscriber line connector 202 may omitted if the level of a signals input to n out from the connector is sufficiently high. Therefore, the present invention is not intended to be limited to the embodiments described herein but is to be accorded the widest scope as defined by the claims.

What is claimed is:

1. An asymmetric data transmission apparatus using asymmetric digital subscriber lines, which connects a high-speed data network to telephone subscriber lines in response to a demand of a subscriber, said apparatus comprising:

a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;

a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and a connection circuit which selectively connects said particular subscriber modem to said particular subscriber line connector and which inputs said particular received analog signal and outputs said particular input analog signal, wherein said connection circuit comprises:
a subscriber line switching circuit which is operatively coupled between said subscriber line connectors and said subscriber modems and which selectively connects said particular subscriber line connector to said particular subscriber modem; and
a line connection controller which is coupled to said subscriber line connectors, which activates said particular subscriber modem by outputting a connection control signal when a particular activation signal is sensed by a particular activation sensor of said particular subscriber line connector, and which outputs a first switching control signal to said subscriber line switching circuit to instruct said subscriber line switching circuit to connect said particular subscriber modem to said particular subscriber line connector,
wherein said line connection controller is operatively coupled to said subscriber modems,
wherein said particular subscriber modem outputs a connection release request signal when a communication between said particular subscriber modem and said particular subscriber line connector has ended, and
wherein said line connection controller outputs a second switching control signal to instruct said subscriber line switching circuit to disconnect said particular subscriber modem and said particular subscriber line connector.

2. An asymmetric data transmission apparatus using asymmetric digital subscriber lines, which connects a high-speed data network to telephone subscriber lines in response to a demand of a subscriber, said apparatus comprising:

a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;

a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and a connection circuit which selectively connects said particular subscriber modem to said particular subscriber line connector and which inputs said particular received analog signal and outputs said particular input analog signal, wherein said particular subscriber line connector comprises:
a voice signal splitter which is connected to said particular telephone subscriber line, separates a voice signal and an analog signal from said particular output signal, transmits said voice signal to a telephone exchange, and prevents said analog signal from being transmitted to said telephone exchange;
a subscriber line interface which is connected to said voice signal splitter, which outputs said analog signal from said voice signal splitter as said particular received analog signal, and which inputs a particular activation signal output from said particular remote unit via said voice signal splitter; and
a particular activation sensor which senses said particular activation signal output from said subscriber line interface and generates a particular activation sensing signal.

3. An asymmetric data transmission apparatus using asymmetric digital subscriber lines, which connects a high-speed data network to telephone subscriber lines in response to a demand of a subscriber, said apparatus comprising:

a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;

a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and a connection circuit which selectively connects said particular subscriber modem to said particular subscriber line connector and which inputs said particular received analog signal and outputs said particular input analog signal, wherein said connection circuit comprises:
 a subscriber line switching circuit which is operatively coupled between said subscriber line connectors and said subscriber modems and which selectively connects said particular subscriber line connector to said particular subscriber modem; and
 a line connection controller which is coupled to said subscriber line connectors, which activates said particular subscriber modem by outputting a connection control signal when a particular activation signal is sensed by a particular activation sensor of said particular subscriber line connector, and which outputs a first switching control signal to said subscriber line switching circuit to instruct said subscriber line switching circuit to connect said particular subscriber modem to said particular subscriber line connector, wherein said particular subscriber modem comprises:
 an analog signal circuit which receives said particular input analog signal and which controls and filters a level of said particular input analog signal to produce a filtered analog signal; and
 a signal modulation/demodulation and data operation ("SMDDO") circuit which demodulates said filtered analog signal to produce a demodulated digital signal and which modulates an unmodulated digital signal to produce a modulated analog signal,
  wherein said analog signal circuit controls and filters a level of said modulated analog signal to produce a particular output analog signal of said output analog signals and wherein said demodulated digital signal corresponds to said particular input digital signal.

4. The apparatus as claimed in claim 3, wherein said particular subscriber modem further comprises:
 a first microprocessor which receives said connection control signal from said line connection controller and activates said particular subscriber modem in response to said connection control signal; and
 a first memory for storing a program executed by said first microprocessor.

5. The apparatus as claimed in claim 4, wherein said particular subscriber modem further comprises:
 a digital signal connector which inputs said demodulated digital signal and outputs said particular input digital signal on a particular digital line of said digital lines and which inputs a particular output digital signal of said output digital signals and outputs said unmodulated digital signal.

6. An asymmetric data transmission apparatus using asymmetric digital subscriber lines, which connects a high-speed data network to telephone subscriber lines in response to a demand of a subscriber, said apparatus comprising:

a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;

a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and a connection circuit which selectively connects said particular subscriber modem to said particular subscriber line connector and which inputs said particular received analog signal and outputs said particular input analog signal, wherein said connection circuit comprises:
 a subscriber line switching circuit which is operatively coupled between said subscriber line connectors and said subscriber modems and which selectively connects said particular subscriber line connector to said particular subscriber modem; and
 a line connection controller which is coupled to said subscriber line connectors, which activates said particular subscriber modem by outputting a connection control signal when a particular activation signal is sensed by a particular activation sensor of said particular subscriber line connector, and which outputs a first switching control signal to said subscriber line switching circuit to instruct said subscriber line switching circuit to connect said particular subscriber modem to said particular subscriber line connector, wherein said subscriber line switching circuit comprises:
  a plurality of switches for selectively connecting said subscriber line connectors to said subscriber modems; and
  a switch controller for switching said switches according to said first switching control signal output from said line connection controller.

7. An asymmetric data transmission apparatus using asymmetric digital subscriber lines, which connects a high-speed data network to telephone subscriber lines in response to a demand of a subscriber, said apparatus comprising:
  a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;
  a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and
  a connection circuit which selectively connects said particular subscriber modem to said particular subscriber line connector and which inputs said particular received analog signal and outputs said particular input analog signal,
  wherein said connection circuit comprises:
    a subscriber line switching circuit which is operatively coupled between said subscriber line connectors and said subscriber modems and which selectively connects said particular subscriber line connector to said particular subscriber modem; and
    a line connection controller which is coupled to said subscriber line connectors, which activates said particular subscriber modem by outputting a connection control signal when a particular activation signal is sensed by a particular activation sensor of said particular subscriber line connector, and which outputs a first switching control signal to said subscriber line switching circuit to instruct said subscriber line switching circuit to connect said particular subscriber modem to said particular subscriber line connector,
    wherein said line connection controller comprises:
      an interrupt manager which inputs a particular activation sensing signal and generates an interrupt signal when said particular activation sensing signal is received, wherein said particular subscriber line connector outputs said particular activation sensing signal when said particular activation signal is sensed by said particular activation sensor;
      a first microprocessor which inputs said interrupt signal and outputs a microprocessor control signal based on said interrupt signal;
      a switch control signal connector which generates said connection control signal for activating said particular subscriber modem and which generates said first switching control signal for instructing said subscriber line switching circuit to connect said particular subscriber modem and said particular subscriber line connector in response to said microprocessor control signal; and
      a first memory for storing a program executed by said first 20 microprocessor,
        wherein said particular subscriber modem outputs a connection release request signal when a communication between said particular subscriber modem and said particular subscriber line connector has ended, and
        wherein said switch control signal connector inputs said connection release request signal and outputs a corresponding second switching control signal to instruct said subscriber line switching circuit to disconnect said particular subscriber modem and said particular subscriber line connector.

8. An asymmetric data transmission apparatus using asymmetric digital subscriber lines, which connects a high-speed data network to telephone subscriber lines in response to a demand of a subscriber, said apparatus comprising:
  a plurality of subscriber line connectors which are respectively connected to said telephone subscriber lines, which respectively comprise activation sensors that receive activation signals from remote units via said telephone subscriber lines, and which respectively receive output signals from said remote units and output corresponding received analog signals, wherein said activation signals are requested from said remote units to be respectively connected to said high-speed data network, and wherein a particular subscriber line connector inputs a particular output signal from a particular remote unit via a particular telephone subscriber line and outputs a particular received analog signal;
  a plurality of subscriber modems which are respectively connected to digital lines of said high-speed data network, which respectively modulate output digital signals transmitted from said high-speed data network via said digital lines into output analog signals, and which respectively demodulate input analog signals into input digital signals and supply said input digital signals to said high speed network, wherein a particular subscriber modem inputs a particular input analog signal and outputs a particular input digital signal; and
  a connection circuit which selectively connects said particular subscriber modem to said particular subscriber line connector and which inputs said particular received analog signal and outputs said particular input analog signal,
  wherein said connection circuit comprises:
    a subscriber line switching circuit which is operatively coupled between said subscriber line connectors and said subscriber modems and which selectively connects said particular subscriber line connector to said particular subscriber modem; and
    a line connection controller which is coupled to said subscriber line connectors, which activates said particular subscriber modem by outputting a connection control signal when a particular activation signal is sensed by a particular activation sensor of said particular subscriber line connector, and which outputs a first switching control signal to said subscriber line switching circuit to instruct said subscriber line switching circuit to connect said particular subscriber modem to said particular subscriber line connector, wherein a number of said subscriber modems is less than a number of said subscriber line connectors, wherein said line connection controller is operatively coupled to said subscriber modems, wherein said particular subscriber modem outputs a connection release request signal when a communication between said particular subscriber modem and said particular subscriber line connector has ended, and wherein said line connection controller outputs a second switching control signal to instruct said subscriber line switching circuit to disconnect said particular subscriber modem and said particular subscriber line connector.

9. An asymmetric data transmission apparatus according to claim 8, wherein said particular subscriber line connector comprises:

a voice signal splitter which is connected to said particular telephone subscriber line, separates a voice signal and an analog signal from said particular output signal, transmits said voice signal to a telephone exchange, and prevents said analog signal from being transmitted to said telephone exchange;

a subscriber line interface which is connected to said voice signal splitter, which outputs said analog signal from said voice signal splitter as said particular received analog signal, and which inputs said particular activation signal output from said particular remote unit via said voice signal splitter; and said particular activation sensor which senses said particular activation signal output from said subscriber line interface and generates a particular activation sensing signal.

10. The apparatus as claimed in claim 9, wherein said particular subscriber modem comprises:

an analog signal circuit which receives said particular input analog signal and which controls and filters a level of said particular input analog signal to produce a filtered analog signal; and a signal modulation/demodulation and data operation ("SMDDO") circuit which demodulates said filtered analog signal to produce a demodulated digital signal and which modulates an unmodulated digital signal to produce a modulated analog signal, wherein said analog signal circuit controls and filters a level of said modulated analog signal to produce a particular output analog signal of said output analog signals and wherein said demodulated digital signal corresponds to said particular input digital signal;

a first microprocessor which receives said connection control signal from said line connection controller and activates said particular subscriber modem in response to said connection control signal;

a first memory for storing a program executed by said first microprocessor; and a digital signal connector which inputs said demodulated digital signal and outputs said particular input digital signal on a particular digital line of said digital lines and which inputs a particular output digital signal of said output digital signals and outputs said unmodulated digital signal.

11. The apparatus as claimed in claim 10, wherein said subscriber line switching circuit comprises:

a plurality of switches for selectively connecting said subscriber line connectors to said subscriber modems; and a switch controller for switching said switches according to said first switching control signal output from said line connection controller.

12. An asymmetric data transmission apparatus according to claim 11, wherein said line connection controller comprises:

an interrupt manager which inputs said particular activation sensing signal and generates an interrupt signal when said particular activation sensing signal is received;

a first microprocessor which inputs said interrupt signal and outputs a microprocessor control signal based on said interrupt signal;

a switch control signal connector which generates said connection control signal for activating said particular subscriber modem and which generates said first switching control signal for instructing said subscriber line switching circuit to connect said particular subscriber modem and said particular subscriber line connector in response to said microprocessor control signal; and a first memory for storing a program executed by said first microprocessor, wherein said switch control signal connector inputs said connection release request signal and outputs said second switching control signal to instruct said subscriber line switching circuit to disconnect said particular subscriber modem and said particular subscriber line connector.

\* \* \* \* \*